(12) United States Patent
Davis et al.

(10) Patent No.: US 9,762,408 B2
(45) Date of Patent: *Sep. 12, 2017

(54) MODULAR WIRELESS POWER, LIGHT AND AUTOMATION CONTROL

(71) Applicant: Kortek Industries Pty Ltd, Brisbane (AU)

(72) Inventors: Barrie Davis, Sanctuary Cove (AU); Benjamin Davis, Alderley (AU); Matthew Davis, Sanctuary Cove (AU)

(73) Assignee: Kortek Industries Pty Ltd, Brisbane (AU)

( * ) Notice: Subject to any disclaimer, the term of this patent is extended or adjusted under 35 U.S.C. 154(b) by 0 days.

This patent is subject to a terminal disclaimer.

(21) Appl. No.: 15/451,369

(22) Filed: Mar. 6, 2017

(65) Prior Publication Data

US 2017/0195131 A1 Jul. 6, 2017

Related U.S. Application Data

(63) Continuation of application No. 15/132,225, filed on Apr. 18, 2016, now Pat. No. 9,589,459, which is a
(Continued)

(51) Int. Cl.
*H04L 12/28* (2006.01)
*H04W 4/00* (2009.01)
(Continued)

(52) U.S. Cl.
CPC .......... *H04L 12/2832* (2013.01); *G05B 15/02* (2013.01); *H04M 1/7253* (2013.01);
(Continued)

(58) Field of Classification Search
CPC ............... H04L 12/2803; H04L 12/282; H04L 12/2816; H04L 12/2829; H04L 12/2832;
(Continued)

(56) References Cited

U.S. PATENT DOCUMENTS

| 3,733,528 A | 5/1973 | Gilbreath |
| 5,909,183 A | 6/1999 | Borgstahl et al. |

(Continued)

FOREIGN PATENT DOCUMENTS

| CN | 1925527 | 3/2007 |
| CN | 102186281 | 9/2011 |

(Continued)

OTHER PUBLICATIONS

HomeTheaterForum: "Logitech Harmony Link Review Part 1 of 2)", https://www.youtube.com/watch?v=NGIE-zF7Rg0, uploaded Feb. 13, 2012.
(Continued)

*Primary Examiner* — Ali Neyzari
(74) *Attorney, Agent, or Firm* — Eager & Martin Pty Ltd

(57) ABSTRACT

A device and method for controlling a host apparatus (300) through a wireless link with a personal controller (10). The device includes a wireless communications module (202) configured to communicate with personal controller (10) via a peer-to-peer communications standard. The device connects to host apparatus (300) via a plug and receptacle interface (206) which includes power and signal pins. The device simulates an actuation signal using a reed relay (216) to cause host apparatus (300) to perform a function.

17 Claims, 3 Drawing Sheets

Related U.S. Application Data continuation of application No. 14/398,120, filed as application No. PCT/AU2013/000260 on Mar. 15, 2013, now Pat. No. 9,319,234.

(60) Provisional application No. 61/652,485, filed on May 29, 2012, provisional application No. 61/678,020, filed on Jul. 31, 2012, provisional application No. 61/678,810, filed on Aug. 2, 2012.

(51) Int. Cl.
*H04M 1/725* (2006.01)
*G05B 15/02* (2006.01)
*H04W 84/12* (2009.01)

(52) U.S. Cl.
CPC ..... *H04W 4/008* (2013.01); *H04L 2012/2841* (2013.01); *H04W 84/12* (2013.01)

(58) Field of Classification Search
CPC ............ H04L 2012/2841; G05B 15/02; G05B 19/4185; G05B 2219/23297; G05B 2219/25022; G08C 17/02; H04M 1/72533; H04M 1/7253; H05B 37/0218; H04W 4/008; H04W 84/12
USPC .................................. 340/12.5; 700/83, 297
See application file for complete search history.

(56) References Cited

U.S. PATENT DOCUMENTS

| | | | |
|---|---|---|---|
| 6,585,596 B1 | 7/2003 | Leifler et al. | |
| 7,024,501 B1 | 4/2006 | Wright | |
| 7,380,145 B2 | 5/2008 | Albulet | |
| 7,964,989 B1 | 6/2011 | Puschnigg | |
| 8,290,515 B2 | 10/2012 | Staton | |
| 8,478,450 B2 | 7/2013 | Lu et al. | |
| 8,995,981 B1 | 3/2015 | Aginsky et al. | |
| 9,043,047 B2 | 5/2015 | Feldkamp et al. | |
| 9,319,234 B2 * | 4/2016 | Davis ................. | H04L 12/2803 |
| 9,589,459 B2 * | 3/2017 | Davis .................... | G08C 17/02 |
| 2002/0130652 A1 | 9/2002 | Bessler | |
| 2005/0096753 A1 | 5/2005 | Arling et al. | |
| 2005/0174962 A1 | 8/2005 | Gurevich et al. | |
| 2005/0219208 A1 | 10/2005 | Eichenberger et al. | |
| 2006/0028997 A1 | 2/2006 | McFarland | |
| 2007/0263600 A1 | 11/2007 | Sutardja et al. | |
| 2007/0290793 A1 | 12/2007 | Tran | |
| 2007/0293208 A1 | 12/2007 | Loh et al. | |
| 2008/0143493 A1 | 6/2008 | Nam et al. | |
| 2008/0218148 A1 | 9/2008 | Robertson et al. | |
| 2009/0058635 A1 | 3/2009 | LaLonde et al. | |
| 2009/0316671 A1 | 12/2009 | Rolf et al. | |
| 2010/0031295 A1 | 2/2010 | Krzyzanowski | |
| 2010/0037071 A1 | 2/2010 | Chang | |
| 2010/0141153 A1 | 6/2010 | Recker et al. | |
| 2010/0271802 A1 | 10/2010 | Recker et al. | |
| 2010/0297941 A1 | 11/2010 | Doan et al. | |
| 2010/0327766 A1 | 12/2010 | Recker et al. | |
| 2011/0026504 A1 | 2/2011 | Feinberg | |
| 2011/0050451 A1 | 3/2011 | Mierta | |
| 2011/0065458 A1 | 3/2011 | Staton et al. | |
| 2011/0065485 A1 | 3/2011 | Jin et al. | |
| 2011/0121654 A1 | 5/2011 | Recker et al. | |
| 2011/0133655 A1 | 6/2011 | Recker et al. | |
| 2011/0173313 A1 | 7/2011 | Owhadi et al. | |
| 2011/0225305 A1 | 9/2011 | Vedantham et al. | |
| 2011/0243151 A1 | 10/2011 | Diab et al. | |
| 2011/0244848 A1 | 10/2011 | Misumi et al. | |
| 2011/0311052 A1 | 12/2011 | Myers et al. | |
| 2012/0026726 A1 | 2/2012 | Recker et al. | |
| 2012/0043889 A1 | 2/2012 | Recker et al. | |
| 2012/0080944 A1 | 4/2012 | Recker et al. | |
| 2012/0091804 A1 | 4/2012 | Altonen et al. | |
| 2013/0142181 A1 | 6/2013 | Makim et al. | |
| 2014/0244044 A1 | 8/2014 | Davis et al. | |
| 2014/0244045 A1 | 8/2014 | Davis et al. | |
| 2014/0244063 A1 | 8/2014 | Davis et al. | |
| 2015/0056979 A1 | 2/2015 | Davis et al. | |
| 2015/0287041 A1 | 10/2015 | Davis et al. | |
| 2016/0249439 A1 | 8/2016 | Recker et al. | |

FOREIGN PATENT DOCUMENTS

| | | |
|---|---|---|
| EP | 1626532 | 2/2006 |
| JP | 2006157098 A | 6/2006 |
| JP | 2007519269 A | 7/2007 |
| JP | 2007-318733 | 12/2007 |
| JP | 2011-217064 | 10/2011 |
| WO | 2005084339 | 9/2005 |
| WO | 2010/085138 | 7/2010 |
| WO | 2011/159921 | 12/2011 |

OTHER PUBLICATIONS

"Mixed-Mode WLAN: Integration of Ad Hoc Mode with Wireless LAN infrastructure" IEEE GLOBECOM 2003, pp. 231-235, Chen et al.

PCT International Search Report for PCT/AU2012/000959, dated May 16, 2013, 21 pages.

* cited by examiner

MODULAR WIRELESS POWER, LIGHT AND AUTOMATION CONTROL

CROSS REFERENCE TO RELATED APPLICATIONS

This application is a continuation of U.S. application Ser. No. 15/132,225, filed Apr. 18, 2016, which is a continuation of U.S. application Ser. No. 14/398,120, which is a national phase entry of PCT/AU2013/000260, filed Mar. 15, 2013, which claims the benefit of U.S. Provisional Application Nos. 61/641,166, filed 1 May 2012; 61/652,485, filed 29 May 2012; 61/678,020, filed 31 Jul. 2012; and 61/678,810, filed 2 Aug. 2012. The entire contents of each of the above-identified applications is hereby incorporated by reference herein.

FIELD OF THE INVENTION

The present disclosure generally relates to a system of interchangeable wireless communications and control modules for domestic and commercial devices that allow a standard smartphone, tablet or similar item to act as a personal controller using a wireless peer-to-peer communications link and/or a wireless local area network.

BACKGROUND OF INVENTION

Many residential and commercial buildings have electrical power, lights, doors, gates, shutters, awnings and blind mechanisms that can be operated or programmed using buttons, switches or remote controls. Current methods of wireless control involve handheld devices that typically use sub-1 GHz technologies to send open/close, on/off, or other commands to a receiver integrated into the main mechanism of a device. On receiving a remote control command, the mechanism may, amongst other actions, open or close a door, raise or lower a blind, turn lights on or off, or control the flow of power.

In recent years, the proliferation of smartphones has placed powerful computing devices in the hands of the public. While these devices can generate and transmit wireless control commands, their generic wireless systems are not compatible with the standards currently used in domestic or commercial appliances and mechanisms, so they cannot natively communicate with such in order to execute a command. The ability to deploy a universal communication method is frustrated by the fact that there exist multiple smartphone operating systems that have different communication capabilities, or may be optimized to more efficiently use different communication standards to other operating systems. This makes it difficult to specify a single communication standard suitable for embedding in power, light, door, gate, awning or blind systems that could work ubiquitously with all smartphones across all applications.

Smartphones typically have an operational life of two years while controllable power, light, door, gate, awning and blind mechanisms usually have an operational life greater than ten years. The rapid turnover of smartphones places pressure on manufacturers to continually improve each successive generation. Smartphones therefore tend to integrate the latest communication technology in order to remain competitive. With no unified standard specifying a generic smartphone communication platform, the communication technology one manufacturer chooses may not be adopted by all manufacturers. Alternately, one manufacturer may choose to add restrictions around their communication capabilities that others do not, or may adopt new technology that is not compatible with previous standards.

It can be appreciated that manufacturers of controllable power, light, door, gate, shutter, awning and blind mechanisms may find it highly advantageous for customers to control their products natively from a smartphone. The problem is that integrating the enabling technology has a cost, which increases as more components are required to address the different communication capabilities across different smartphone operating systems and handset configurations in the market. This is compounded by the fact that the long operational life of power, light, door, gate, awning and blind mechanisms results in a high probability that any embedded communication standard may become obsolete before the end of the operational life of the mechanism.

SUMMARY

In one exemplary embodiment, the system utilizes three parts: an interchangeable module with control and wireless communication capabilities; an interface connection adapted to supply power and exchange commands and information with an interchangeable module; and a battery powered personal controller able to communicate with an interchangeable module via a wireless communications link. It will be appreciated that reference herein to "preferred" or "preferably" is intended as exemplary only.

The interchangeable module is preferably configured to operate as an adaptable Wi-Fi Direct access point/group participant and network Wi-Fi device either individually or concurrently, using WiFi-Direct and/or network Wi-Fi technologies, and may include additional support for Bluetooth SIG class 2.1+EDR or later. As used herein, "network Wi-Fi" refers to the Wi-Fi Alliance definition as any "wireless local area network (WLAN) products that are based on the Institute of Electrical and Electronic Engineers (IEEE) 802.11 standards" including any amendments, extensions or proprietary implementations. As used herein, the term "Wi-Fi Direct" refers to a device configured to support the Wi-Fi Alliance Wi-Fi Direct specification and amendments, extensions or proprietary implementations of Wi-Fi peer-to-peer technology.

Wi-Fi Direct and Bluetooth are peer-to-peer communication technologies. Peer-to-peer communication methods that may be incorporated into the interchangeable module are described in more detail in PCT Application No. PCT/AU2011/001666, filed Dec. 29, 2011, titled "Wireless Power, Light and Automation Control," the entire disclosure of which is incorporated herein by reference. Network Wi-Fi is a communication technology that allows devices to communicate through a WLAN. Adaptable network and peer-to-peer communication methods that may be incorporated into the interchangeable module are described in more detail in PCT Application No. PCT/AU2012/000959, filed Aug. 15, 2012, titled "Adaptable Wireless Power, Light and Automation System" the entire disclosure of which is incorporated herein by reference.

The personal controller is preferably a commercially available cellular or mobile phone commonly known as a smartphone that supports at least network Wi-Fi and may also support Wi-Fi Direct and/or Bluetooth and/or Near Field Communications (NFC). Unless otherwise noted, the personal controller will be described in terms of a smartphone, though the invention is not so limited. For example only, the personal controller may be any portable device which can download or install by other means an App, have a suitable interface the user can interact with to control the App in order to execute required functions, and have the wireless communications capability to establish communications with an interchangeable module. Examples of personal controllers include smartphones, tablets, laptops, ultrabooks and notebook personal computers.

The interchangeable module can preferably form a communications link with a smartphone using Wi-Fi Direct and/or network Wi-Fi. It can be appreciated that when an interchangeable module is connected to a WLAN, any smartphone with Wi-Fi capability also connected to the same WLAN can use an appropriate App to communicate with the interchangeable module. In this way, a user can enter a command into their smartphone and send it to the appropriate interchangeable module via the WLAN. The smartphone could be in the vicinity of the WLAN access point, or the smartphone could be at a remote location and communicate with the WLAN access point via the Internet if so configured.

It can be appreciated that an interchangeable module operating as a Wi-Fi Direct access point/group participant can communicate directly with a smartphone without the requirement of a WLAN. In this case, the interchangeable module appears as a Wi-Fi access point or SoftAP if the smartphone is not using Wi-Fi Direct to communicate; or if the smartphone is using Wi-Fi Direct to communicate, the interchangeable module and smartphone will negotiate which assumes the Wi-Fi Direct group owner role and establish a peer-to-peer connection. Once a peer-to-peer connection has been established, the user is able to send commands directly to the selected interchangeable module without the need for any other device, intermediary or network.

The present disclosure in one preferred embodiment includes an interchangeable module with wireless communication capabilities derived from any number of radios, transceivers and controllers that provide a network Wi-Fi and Wi-Fi Direct connection individually or concurrently with the ability to optionally support Bluetooth. Depending on cost and desired outcome, the wireless communication capabilities may be achieved by using: any number of discrete radios, aerials, transceivers and controllers either individually, collectively, or as a system in package (SiP) or as a system on chip (SoC); a combination or "combo" chip that aggregates the functionality of a number of discrete transceivers and controllers of different standards as a SiP or SoC; or using a combination of combo chip/s, SiP/s, SoC/s and/or discrete radios, aerials, transceivers and controllers. The interchangeable module may utilize single or multiple wireless bands, physical channels, virtual channels, modes or other coexistence technologies and algorithms, the methods of which are already known to those skilled in the art and are not described herein. Depending on the chosen hardware components, the interchangeable module may also include shared antenna support and shared signal receiving paths to eliminate the need for an external splitter.

The disclosure in another embodiment sets forth an interchangeable module with wireless communications that in a first mode provides a Wi-Fi Direct peer-to-peer connection and in a second mode can be configured by the user to operate as a network Wi-Fi device and connect to a WLAN as a client.

The interchangeable module preferably has its wireless communications set to initially function in Wi-Fi Direct access point/group participant mode irrespective of its final configuration. Because the Wi-Fi Direct access point/group participant mode is a peer-to-peer connection, as soon as power is applied to the interchangeable module, it can be recognised by a smartphone and a wireless communications link can be established. Once the link is established, the user is able to activate a smartphone App which uses the data path between the smartphone and interchangeable module. Using a smartphone App, the user can set the operational parameters required for a network Wi-Fi or Wi-Fi Direct device, name the device, set an encryption key, enter a password and any other requirements. When this procedure has been completed, the user can command the interchangeable module to "restart", at which time it will configure itself according to the parameters which have been specified during the setup process.

If the user has chosen the interchangeable module to operate as a Wi-Fi Direct device, it would continue to do so after the restart. The interchangeable module would only connect to smartphones that can fully comply with its connection requirements before establishing a communications link. This may include security measures in addition to any native security measures of Wi-Fi Direct such as Wi-Fi Protected Access.

If the user has chosen the interchangeable module to operate as a network Wi-Fi device, the smartphone App would configure the necessary parameters for the interchangeable module to connect to a WLAN. When the interchangeable module restarts, it would connect and appear as a client device on the WLAN. It would only be accessible to devices which can also connect to the same WLAN.

In either mode, a smartphone App is preferably used control the functional capabilities of the interchangeable module. In network Wi-Fi mode, the smartphone App communicates with the selected interchangeable module via a WLAN access point. In Wi-Fi Direct mode, the smartphone App communicates directly with the selected interchangeable module peer-to-peer.

If the user has chosen the interchangeable module to operate as both a Wi-Fi Direct device and network Wi-Fi device concurrently, when the interchangeable module restarts it would appear as a client device on the WLAN and as a Wi-Fi Direct access point/group participant. In that way an interchangeable module could allow third parties to control functions via a Wi-Fi Direct connection without having to allow access to the concurrent WLAN connection, thus preventing access to other WLAN devices.

In one preferred embodiment, a Bluetooth peer-to-peer connection between a smartphone and interchangeable module may be used to enter the information for configuration of the interchangeable module as a network Wi-Fi device and/or Wi-Fi Direct access point/group participant operating either individually or concurrently.

The interface connection is preferably a physical connector designed specifically to allow an interchangeable module to plug into a receptacle on a host device. The host device interface connection is preferably integrated into a domestic or commercial appliance, mechanism or device where wireless communication with a smartphone is desirable, but where the permanent embedding of a wireless communication standard is not advantageous. Examples include, but are not limited to: garage door mechanisms, gate mechanisms, motorized blind and awning mechanisms, motorized screen mechanisms, light switches, lighting controllers, power points, power control mechanisms, climate control equipment such as thermostats and air conditioning units, sprinkler and watering systems, pumps, pool filtration systems, gas metering and control equipment, peripheral computer equipment, consumer electronics, whitegoods, vehicles, and alarm systems. In one preferred embodiment, the interface connection can be performed by using a Universal Serial Bus (USB) connector; however it can be appreciated that other suitable connectors can be used without departing from the true scope and spirit of the invention. The interface connection preferably allows commands and information to be passed between an interchangeable module and device at the same time as supplying power from the device to the interchangeable module.

The disclosure in a further aspect sets forth a means for plugging an interchangeable module into a domestic or commercial appliance, mechanism or device to provide a communications interface that allows a standard smartphone, tablet or similar item to act as personal controller through a wireless peer-to-peer communications link and/or a wireless local area network.

In another aspect, the disclosure sets forth a device for controlling an electrical apparatus through a wireless communications link with a personal controller. The personal controller has a processor, a user interface, and a wireless communications transceiver. The device includes a wireless communications control module operable for wireless communication with the personal controller. The wireless communications control module includes an aerial and a radio transceiver, the radio transceiver being configured to communicate with the personal controller using a peer-to-peer communications standard. The device also includes an interface connection including at least two power pins and at least one signal pin, the interface connection being configured to physically connect to a receptacle of the electrical apparatus. The device also includes a microcontroller configured to control, through the interface connection, the electrical apparatus based at least in part on instructions communicated from the personal controller through the wireless control module, the device being powered through the electrical apparatus.

In another aspect, the disclosure sets forth a device for controlling an electrical apparatus through a wireless communications link with a personal controller, the personal controller having a processor, a user interface, and a wireless communications transceiver. The device includes a wireless communications control module operable for wireless communication with the personal controller. The wireless communications control module includes an aerial and a radio transceiver, the radio transceiver being configured to communicate with the personal controller using a peer-to-peer communications standard. The device further includes an interface connection including at least one signal pin, the interface connection being configured to physically connect to a receptacle of the electrical apparatus. The device also includes a microcontroller configured to control, through the interface connection, the electrical apparatus on based at least in part on instructions communicated from the personal controller through the wireless control module, the microcontroller being configured to send, through at least one of the signal pins, only an actuation signal without any data to communicate with the electrical apparatus to cause the electrical apparatus to perform a function.

In a further aspect, the disclosure sets forth a device for controlling an electrical apparatus through a wireless communications link with a personal controller, the personal controller having a processor, a user interface, and a wireless communications transceiver. The device includes a wireless communications control module operable for wireless communication with the personal controller, the wireless communications control module including an aerial and a radio transceiver. The device further includes an interface connection including at least one signal pin, the interface connection being configured to physically connect to a receptacle of the electrical apparatus. The device also includes an electrical relay and/or solid state relay, and a microcontroller configured to control, through the interface connection, the electrical apparatus on based at least in part on instructions communicated from the personal controller through the wireless control module. The microcontroller controls the electrical relay and/or solid state relay to send an actuation signal through at least one of the signal pins to the electrical apparatus to cause the electrical apparatus to perform a function.

In yet another aspect, the disclosure sets forth for a method for actuating, with a wireless personal controller, an electrical apparatus having a receptacle configured to receive a plurality of power and signal pins. The method includes inserting into the receptacle a device having an interface connection with at least two power pins and at least one signal pin, the device including a wireless communications control module and a microcontroller configured to communicate with the personal controller using the wireless communications control module; receiving, via the wireless communications control module, an instruction from the personal controller to actuate the electrical apparatus; sending no data, but only an actuation signal to the electrical apparatus using at least one of the signal pins to cause the electrical apparatus to perform a function in conformity with the instruction received from the personal controller.

DETAILED DESCRIPTION OF THE DRAWINGS

Alternative embodiments of the invention will be apparent to those skilled in the art from consideration of the specification and practice of the invention disclosed herein. It is intended that the specification and examples be considered as exemplary only, with a true scope and spirit of the invention being indicated by the claims which follow.

Figure 1:
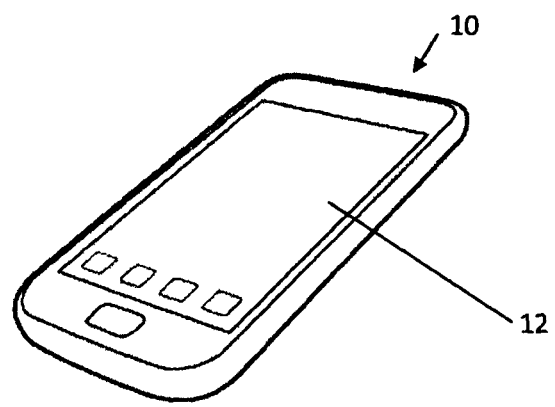
FIG. 1 is a perspective view of a smartphone for use in one preferred embodiment of the disclosure.

FIG. 1 is a perspective representation of a smartphone 10 which uses a wireless link to communicate with an interchangeable module (described in more detail below). Smartphone 10 is preferably a commercially available, conventional smartphone. Some of the basic functions the smartphone preferably includes are: a touch sensitive graphical screen interface 12; a compatible radio transceiver; and the ability to run an application program (App) specific to the individual smartphone that provides a control interface for the interchangeable module. In the examples that follow, specific coding for each App has been omitted for simplicity as a person of ordinary skill in the art would be able to understand and reproduce the functionality of the described embodiments without the need for a discussion on particular coding.

Smartphone 10 is preferably configured to operate across a range of wireless communications technologies, including the technology to communicate via at least network Wi-Fi. Smartphone 10 may additionally include support for Wi-Fi Direct and/or Bluetooth and/or NFC. While some examples described herein use a smartphone as its controller, and specifically a smartphone incorporating at least network Wi-Fi, other wireless communications methods and systems could be used depending on the specific requirements needed.

Figure 2:
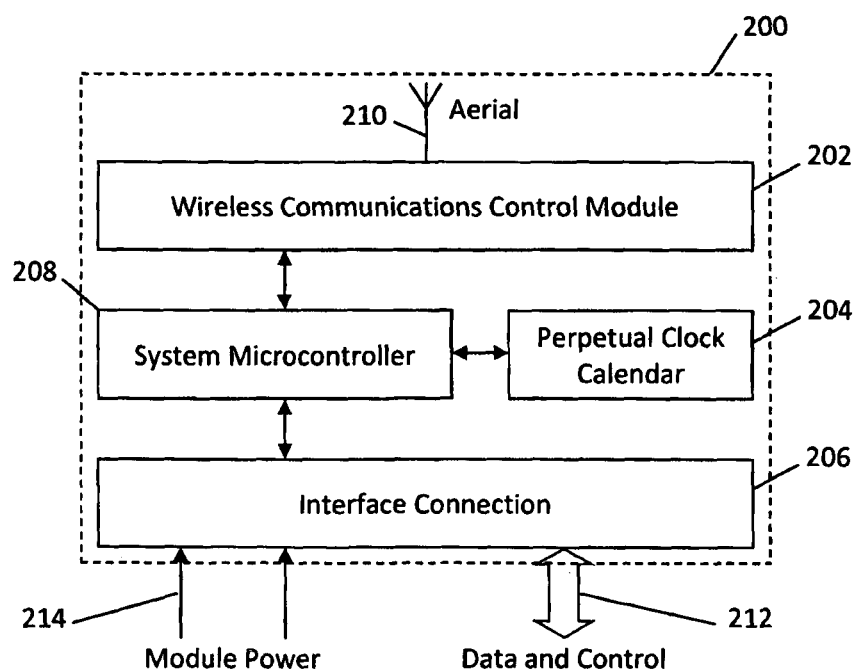
FIG. 2 is a block diagram of the functional elements of an interchangeable module in accordance with one preferred embodiment of the disclosure.

Referring now to FIG. 2, an interchangeable module 200 is shown. Interchangeable module 200 has wireless communications 202, perpetual clock calendar 204, interface connection 206, system microcontroller with embedded memory 208, an aerial 210, external data and control bus 212 for communicating with a host device, and a power supply connection 214. In some exemplary embodiments, it may be preferable for system microcontroller 208 to support external memory in addition to, or instead of, embedded memory.

Perpetual clock calendar 204 preferably includes a power backup by the way of a battery or supercapacitor enabling real time to be accurately maintained in instances where a mains power outage occurs. In some preferred embodiments, perpetual clock calendar 204 may be omitted where interchangeable module 200 does not perform any time or date dependant operations.

The commands and responses between system microcontroller 208 and smartphone 10 are communicated through a radio frequency wireless link supported by wireless communications 202 and aerial 210. Wireless communications 202 preferably includes any number of radios, transceivers and controllers that provide a network Wi-Fi and Wi-Fi Direct connection either individually or concurrently with the ability to optionally support Bluetooth. Examples of wireless communications are described in PCT Application No. PCT/AU2012/000959, filed Aug. 15, 2012. Depending on cost and the desired operational functions, wireless communications 202 may include only a Wi-Fi radio, a combination of Wi-Fi radios, or a combination of Wi-Fi Radio/s and Bluetooth radio. The wireless communication capabilities may be achieved by using: any number of discrete radios, aerials, transceivers and controllers either individually, collectively or as a SiP or SoC; a combination or "combo" chip that aggregates the functionality of a number of discrete transceivers and controllers of different standards as a SiP or SoC; or using a combination of combo chip/s, SiP/s, SoC/s and/or discrete radios, aerials, transceivers and controllers. The interchangeable module may utilize single or multiple wireless bands, physical channels, virtual channels, modes or other coexistence technologies and algorithms, the methods of which are already known to those skilled in the art and are not described herein. Depending on the chosen hardware components, the interchangeable module may also include shared antenna support and shared signal receiving paths to eliminate the need for an external splitter.

When wireless communications 202 operates according to the Wi-Fi Direct specification, it can communicate with devices that support network Wi-Fi or Wi-Fi Direct on a peer-to-peer basis without the need for any intermediary hardware. Wireless communications 202 is preferably configured to operate according to the Wi-Fi Direct specification as both a Wi-Fi Direct group participant and Wi-Fi Direct access point or SoftAP, allowing the interchangeable module to appear to network Wi-Fi devices during discovery as a Wi-Fi access point. After being discovered as a Wi-Fi Direct access point, a Wi-Fi Direct device is able to communicate peer-to-peer with network Wi-Fi devices that support the IEEE 802.11 specification as amended from time to time. In this instance, a network Wi-Fi device will receive a device discovery message from the interchangeable module as if from a Wi-Fi access point and be able to establish a peer-to-peer communications link with the interchangeable module as though it were connecting to a Wi-Fi access point. The procedure of establishing a communications link between a Wi-Fi Direct device and network Wi-Fi devices are defined in the Wi-Fi Alliance specifications and would be understood by practitioners skilled in communications systems protocols.

Wi-Fi Direct has a number of advantages which simplify communications between an interchangeable module and a smartphone operating as a controller. Significant advantages include mobility and portability, where a smartphone and interchangeable module only need to be within radio range of each other to establish a wireless communications link. Wi-Fi Direct offers secure communications through means such as Wi-Fi Protected Access protocols and encryption for transported messages, ensuring the system remains secure to qualified devices. Most importantly, Wi-Fi Direct allows a smartphone with only network Wi-Fi to engage in peer-to-peer data exchange with an interchangeable module even though the smartphone network Wi-Fi was never intended to support on-demand, peer-to-peer communications.

As smartphones continue to evolve, new models are starting to include Wi-Fi Direct support in addition to network Wi-Fi. In one exemplary embodiment, where an interchangeable module receives a Wi-Fi Direct response to a device discovery message, the smartphone and interchangeable module will negotiate which device will assume the role of group owner in accordance with the Wi-Fi Alliance Wi-Fi Direct specification, and a 1:1 or peer-to-peer Wi-Fi Direct communication link will be established. The Wi-Fi Direct specification allows any Wi-Fi Direct device to be a group owner, and depending on the capabilities of the device, the negotiation procedure determines the most suitable device to perform this role.

System microcontroller 208 preferably incorporates a firmware program which defines the operation and functions of interchangeable module 200 and assumes responsibility for running all program code and system elements, including specifying the operation of wireless communications 202, interrogation of the perpetual clock calendar 204, management of the interface connection 206, and transfer of data and control messages to a host device through external data and control bus 212. System microcontroller 208 preferably includes a non-volatile memory to store any program data received from the Product App. In some preferred embodiments, perpetual clock calendar 204 may be an embedded function of system microcontroller 208. In some preferred embodiments, non-volatile memory may be external to system microcontroller 208. In some preferred embodiments, more than one microcontroller may be used.

When interchangeable module 200 is manufactured, system microcontroller 208 preferably holds the firmware to operate interchangeable module as a network Wi-Fi device and Wi-Fi Direct access point/group participant. When power is applied to interchangeable module for the first time, system microcontroller 208 preferably starts interchangeable module in Wi-Fi Direct access point/group participant mode and begins transmitting discovery messages or "pings" that can be detected by a smartphone within wireless range.

It can be appreciated that an interchangeable module operating as a Wi-Fi Direct access point/group participant can communicate directly with a smartphone without needing a Wi-Fi WLAN. Interchangeable module 200 either appears as a Wi-Fi access point if smartphone 10 is not using Wi-Fi Direct; or negotiates with smartphone 10 as to which device will assume a Wi-Fi Direct group owner role if smartphone 10 supports Wi-Fi Direct. The user is then able to establish a peer-to-peer communications link and send commands directly to the selected interchangeable module without the need for any other device.

A preferred method for controlling an interchangeable module is through a related Product App. Installation instructions for the Product App are preferably included with the interchangeable module. The Product App preferably adopts the same centralized app store installation methods common to all smartphone platforms.

The Product App may communicate with any mix of wireless elements and radio technologies to seamlessly provide the best communications link. In one preferred embodiment, Product App may preferably control smartphone 10 wireless communications in order to initiate, search and establish a wireless communications link with an interchangeable module. Product App may preferably display preconfigured and new interchangeable modules via graphical elements on smartphone touch screen 12.

When the Product App starts, it preferably scans for interchangeable modules and identifies any new interchangeable modules that need to be initially configured. At this point the Product App preferably allows the user to establish a peer-to-peer connection with a new interchangeable module and determine if it is: to remain a Wi-Fi Direct access point/group participant only; connect to a WLAN as a client and become a network Wi-Fi device; or, where supported by wireless communications 202, operate simultaneously as a Wi-Fi Direct access point/group participant and network Wi-Fi device.

If the user wants the new interchangeable module to be a Wi-Fi Direct device, they preferably select this option in the Product App. The Product App then leads the user through a series of data inputs using the smartphone's touch screen 12 as a human interface. The Product App communicates with system microcontroller 208 and replaces the general parameters used for the initial connection to specific parameters which define the interchangeable module as a unique Wi-Fi Direct product. These may include: setting a unique encryption key so all data transfers between interchangeable module and the smartphone are protected; setting the interchangeable module name to a unique, easily recognisable identifier, e.g., from a product name such as "Wireless Switch" to "Garage Door"; setting the interchangeable module's unique Wi-Fi address ID so that it becomes an individual device in its own right; and setting a password in the interchangeable module used to establish a secure link with a smartphone.

The Product App preferably maintains a record of these specific parameters in the smartphone memory for future identification of, and connection to, the new interchangeable module.

Once the setup procedure is complete, the Product App preferably commands the interchangeable module firmware to "restart". When the applications firmware restarts, the interchangeable module will use the user loaded data to populate and create its own unique Wi-Fi Direct identity. The smartphone which was used to set this identity will be able to automatically connect to that interchangeable module because the new specific parameters are known. The Product App can then be used to preferably automatically establish a communications link with the interchangeable module each time the user selects that particular device.

Once an interchangeable module has been configured, any other smartphone can only connect if the user knows the specific parameters that are now unique to that particular interchangeable module. If a second smartphone searches for Wi-Fi access points or Wi-Fi Direct devices, it will see the interchangeable module identified as, for example, "garage door" with the characteristic that it is "secure". To connect to it, the user will have to know the specific password allocated to that interchangeable module, otherwise it will not be able to establish a communications link. If the password is known and entered into the smartphone when requested, a communication link between the second smartphone and the interchangeable module will be established. The Product App is still preferably required to control the interchangeable module and may have additional security requirements depending on the nature of the application.

If, instead of configuring the newly installed interchangeable module as a Wi-Fi Direct access point/group participant, the user chooses it to be a network Wi-Fi device, this is selected as the requested option and the Product App determines if there are one or more WLANs available for the interchangeable module to connect to as a client. The Product App requests the user to confirm the preferred network and asks the user to confirm and/or input any necessary network parameters such as the network password so the interchangeable module can connect to the WLAN as a client.

The Product App, preferably via the smartphone, communicates with system microcontroller 208 and sets the parameters needed for the interchangeable module to establish itself as a network Wi-Fi device. When all of the appropriate parameters are known and updated, the Product App commands the interchangeable module to restart its firmware as a network Wi-Fi device. The interchangeable module then connects to the WLAN as a client and is preferably only accessible by the smartphone Product App via the WLAN access point. The interchangeable module running as a network Wi-Fi client can then be controlled by other smartphones as long as they are connected to the same WLAN. In one preferred embodiment, it may be desirable for the interchangeable module to include additional security measures such as password protection, a SoCket layer with the Product App, or other measures to prevent the interchangeable module being controlled by other devices on the network without authorization.

Once an interchangeable module has been configured as a Wi-Fi Direct access point/group participant or a network Wi-Fi device, it preferably continues to operate in that mode even after it has been powered off. All of the specific operating parameters for each mode are preferably saved in non-volatile memory and are retained if power is lost. When power is restored, system microcontroller 208 powers up the same Wi-Fi mode as was running before power was removed, and the appropriate firmware and operating parameters are restored from non-volatile memory.

There are applications where an interchangeable module running concurrent Wi-Fi Direct access point/group participant and network Wi-Fi capabilities is desirable. In this situation, the user via the Product App can activate both modes, allowing either mode to be used. Equally, the user, via the Product App, can choose to disable one of the modes, or can change the Wi-Fi mode from Wi-Fi Direct access point/group participant to network Wi-Fi, or vice versa as desired.

Each time the Wi-Fi mode is changed, the parameters for the new mode are preferably retained by system microcontroller 208 in the event power is disconnected or lost. When power is restored, system microcontroller 208 powers up in the same Wi-Fi mode as previously operating before power was removed, and the appropriate operating parameters are restored from the non-volatile memory.

It is envisaged that there may be times when an interchangeable module may be moved to a new host device where the current Wi-Fi mode may not be suitable, or the original WLAN may no longer be available. The Product App is preferably able to communicate with an interchangeable module and command it to re-initialise to the factory default configuration. In this case, all user-defined parameters that were loaded into the interchangeable module are lost and it is returned to its factory default state, ready to receive new user-defined parameters.

In one preferred embodiment, if interchangeable module is configured as a network Wi-Fi device and is unable to connect to the specified WLAN as a client, interchangeable module may automatically default to Wi-Fi Direct mode in order to allow smartphone 10 to establish a peer-to-peer connection.

The interchangeable module may incorporate a mechanical means such as a button or switch which the user could activate to cause the interchangeable module to re-initialise to the factory default configuration without the use of a smartphone or Product App.

In one preferred embodiment, the interchangeable module may include Bluetooth communication capabilities in addition to Wi-Fi Direct access point/group participant and network Wi-Fi capabilities. A peer-to-peer Bluetooth communication link between smartphone and interchangeable module may be used by the Product App to enter parameters for establishing a Wi-Fi Direct access point/group participant or network Wi-Fi communications link, or may in its own right operate as a peer-to-peer communications link for transfer of control commands between Product App and interchangeable module. Similarly, NFC can be included and used where desirable.

In one preferred embodiment, the interchangeable module may incorporate a mechanical means such as a button or switch that may facilitate the secure initialization of a peer-to-peer connection.

With continued reference to FIG. 2, in one preferred embodiment, the interchangeable module may include an NFC tag that the Product App could use when first communicating with a new interchangeable module to automatically establish a Wi-Fi Direct access point/group participant peer-to-peer communications link on smartphones that support NFC. This process is commonly referred to as "bootstrapping" and is an established method for initializing communications known by those skilled in the art.

In one preferred embodiment, interface connection 206 may operate as conduit for the transfer of complex command and control data from system microcontroller 208 to an external processor in a host device via external data and control bus 212. In another preferred embodiment, interface connection 206 may operate only to vary an electrical signal element of the external data and control bus 212 thereby causing an event condition in a host device. By way of example only, this could be used to replicate the same condition as pushing a hardwired open/close button in a garage door opener.

It will be appreciated that the steps described above may be performed in a different order, varied, or certain steps added or omitted entirely without departing from the scope of the present disclosure. It will also be appreciated by those skilled in the art that the system described above can be varied in many ways without departing from the scope of the present disclosure. By way of example only, elements of wireless communications 202, system microcontroller 208, perpetual clock calendar 204 and interface connection 206 may be aggregated into a single or various SoCs or SiPs.

The mechanical and electrical connection between an interchangeable module and host device is preferably adapted to: be extremely reliable; have adequate signal connections; be sufficiently flexible to meet different system requirements; and be easy to use. There are many electrical plug/receptacle systems that meet these requirements, but most are proprietary to their manufacturers or are not used universally worldwide.

In one preferred embodiment, the plug/receptacle integrated into interchangeable module 200 is preferably a Universal Serial Bus (USB) Standard Type A as specified by the USB Implementers Forum. The USB Standard Type A plug/receptacle specifies two power pins (Vcc and ground) and two signal pins (Data+ and Data−). The host device preferably provides the interchangeable module with power via USB Standard Type A SoCket pins 1 and 4 (see FIG. 2, 214) and accepts two control signals via pins 2 and 3 (see FIG. 2, 212). Pins 2 and 3 preferably connect to an electrical relay or solid state relay of which an example is a normally open (NO) reed relay 216 in interchangeable module 200 that allows a circuit to be closed irrespective of the polarity of the signal voltages from the host device. This application replicates the closure of a manual pushbutton switch and allows an interchangeable module to simulate the activation of a pushbutton in response to a command from a smartphone.

Figure 3:
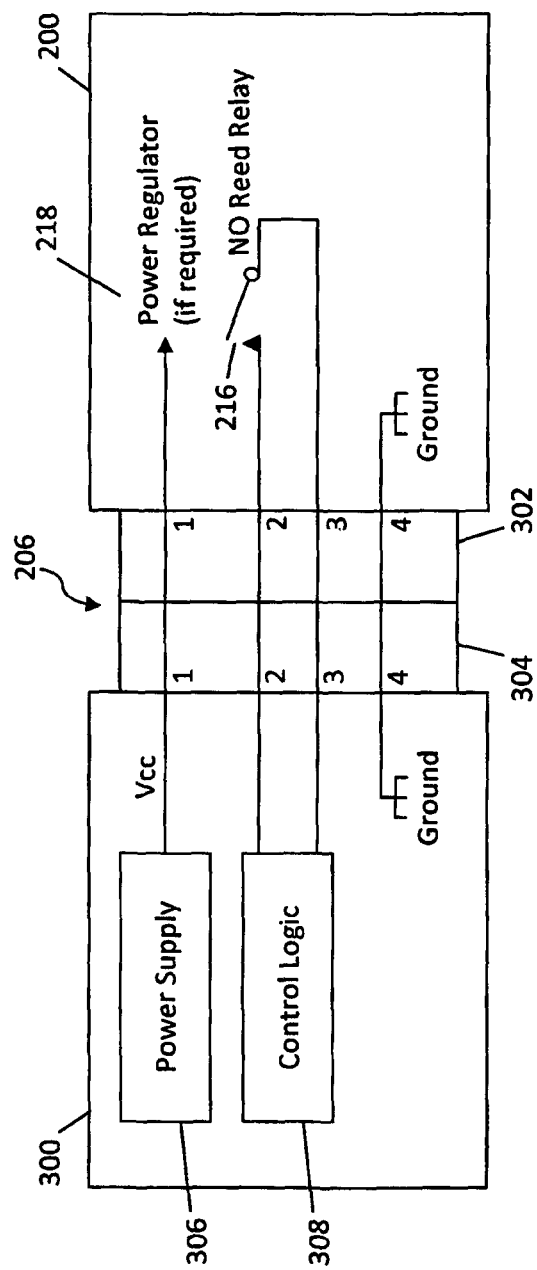
FIG. 3 is a block diagram of the interface connection between the interchangeable module of FIG. 2 and a host device in one preferred embodiment of the disclosure.

FIG. 3, is pictorial representation of interchangeable module 200 plugged into host device 300 where interface connection 206 is via USB Standard Type A plug 302 and USB Standard Type A receptacle 304. Power for interchangeable module 200 is preferably provided by host device 300 power supply 306 through the interconnection of pins 1 and 4 of plug 302 and receptacle 304 to power regulator 218 if required. Signal connections between control logic 308 of host device 300 and NO reed relay 216 of interchangeable module 200 is preferably through the interconnection of pins 2 and 3 of plug 302 and receptacle 304.

When interchangeable module 200 is plugged into host device 300 a complete system is formed by the interconnection of plug 302 and receptacle 304. NO reed relay 216 becomes an integral and functional part of host system control logic 308, and commands wirelessly transmitted to the interchangeable module from an App running on smartphone 10 are able to cause NO reed relay 216 to close, thereby triggering control logic 308 to perform a function in host device 300. By way of example only, if host device were a garage door mechanism, smartphone 10 could cause NO reed relay 216 to pulse closed then open again. Control logic 308 could interpret each pulse as a command to open or close a garage door, working in the same way as a wall mounted button usually installed within a garage, or the open/close button on a wireless clicker or remote.

It can be appreciated that the use of NO reed relay 216 is a very simple control mechanism and that more complex implementations of the external data and control bus with a host device 300 are possible.

In one preferred embodiment, pins 2 and 3 of the USB Standard Type A plug and receptacle could preferably form a serial data bus, thereby significantly expanding the amount of data that can be exchanged between an interchangeable module and central control unit of a host device. Asynchronous signalling methods and protocols, similar to that used by dial-up modems, through to high speed packet data techniques used by certified USB devices or similar could be supported.

In another preferred embodiment, USB Standard Type A plug and receptacle may be substituted by a USB micro-B USB 3.0 plug and receptacle that provides ten physical connections between a host device and interchangeable module. Without limiting the scope of the present disclosure, a pin can be allocated for Vcc and two pins for ground, leaving seven signal interconnections that can provide simple control signals for level sensitive exchange of information through to a mixture of serial and parallel data transfers depending on the application.

In another preferred embodiment, it may be desirable to position the interchangeable module a significant distance from the host device. This could be accomplished by using balanced drivers and receivers as an electrical interface. For short distances, simple CMOS electrical interfaces may be adequate. By using data transmission interfaces such as RS-485, it could be possible to separate the interchangeable module and host device up to 1200 meters and still maintain a baud rate of 100 kbits/sec if needed.

In one preferred embodiment, a host device may simultaneously support multiple interchangeable modules through a number of interface connections. This would allow a host device to accept commands from a number of interchangeable modules where each may be configured for a specific smartphone model or operating system, thereby allowing multiple smartphones with different communications capabilities, requirements or restrictions to talk to the same host device.

Figure 4:
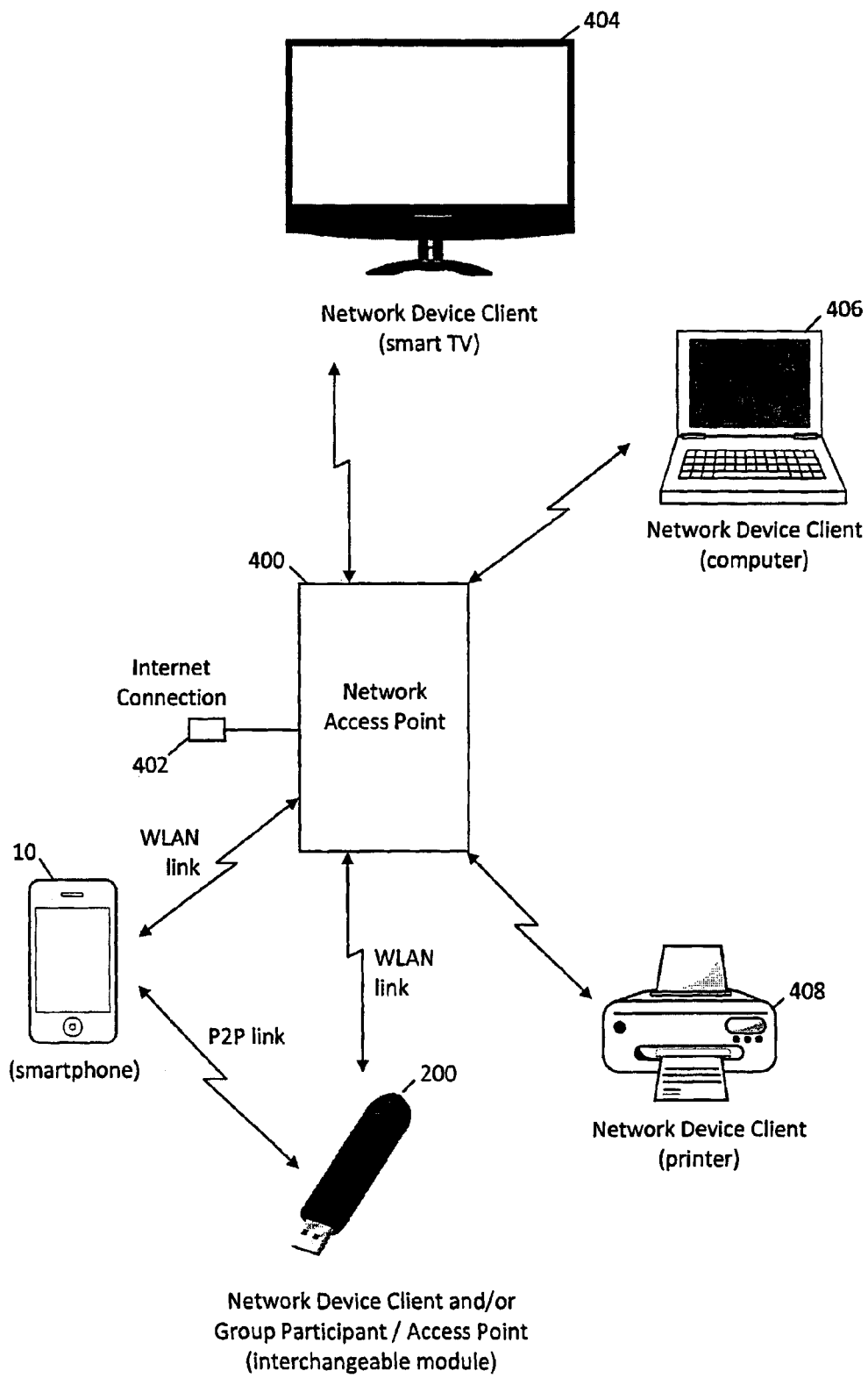
FIG. 4 is a system pictorial representation of the smartphone of FIG. 1 and its interaction with the interchangeable module of FIG. 2.

While USB connectors offer a convenient interface, the present disclosure is not so limited. It will be appreciated that the interconnection methods between an interchangeable module and host may be performed by a range of different plug and receptacle types without departing from the scope of the present disclosure. For example, the motherboard/daughterboard connection system common to Personal Computers could be used where preferably the interchangeable module would be a printed circuit board assembly incorporating etched fingers which interconnect to the host system via a suitable mating connector. A motherboard/daughterboard connection system would be understood by practitioners skilled in electronics systems interconnection methods FIG. 4 is a system pictorial representation of a Wi-Fi WLAN which has an access point 400 as the network control unit or hub. Access point 400 has an Internet connection 402. Wirelessly connected to access point 400 are shown five network clients, although the number of network clients is only limited by the capabilities of access point 400. The network, for example, can have access point 400, network client 404 (smart TV), network client 406 (computer) and network client 408 (printer).

All communications over the WLAN preferably pass through access point 400. For smartphone 10 and interchangeable module 200 to communicate with each other, they must be part of the same network. As shown in FIG. 4, smartphone 10 and interchangeable module 200 are network clients of access point 400. For smartphone 10 to communicate with interchangeable module 200, it would communicate with access point 400 which would pass any messages from smartphone 10 onto interchangeable module 200. The same happens for any messages computer 406 sends to interchangeable module 200. Accordingly, it can be seen that: (1) access point 400 continuously operates for the network to be available for communications; (2) the network is limited to an area which is defined by the maximum radio transmission distance between a network client and the access point; (3) a network requires an access point and at least one network client; and (4) at least one network client must be able to configure and maintain the access point operations.

Instead of communicating through a Wi-Fi WLAN, interchangeable module 200 may be configured to establish a peer-to-peer communications link with smartphone 10 as shown in FIG. 4, thereby bypassing the WLAN. In that instance, smartphone 10 can wirelessly connect directly to interchangeable module 200 without requiring the services of any additional device. If smartphone 10 is also a Wi-Fi Direct device, it can negotiate with interchangeable module 200 to determine which of them will be the group owner. The access point/group owner can set up 1:N connections if allowed so that more than one client could have a communications link with the group owner at the same time, for example, in a hub and spoke arrangement where the access point/group owner is the hub. Accordingly, it can be seen that: (1) a third device such as access point 400 is not required for peer-to-peer communications to be established; (2) the communications link may be formed on an "as needed" basis; and (3) that smartphone 10 needs to be within radio range of interchangeable module 200 to establish a communications link.

It can be appreciated by those skilled in the art that a network Wi-Fi connection and a Wi-Fi Direct peer-to-peer connection offer a different mix of convenience and security. An interchangeable module operating as a network Wi-Fi device may be remotely controlled by a smartphone where the access point has an internet connection, however the interchangeable module then becomes exposed to the outside world and may be vulnerable to external threats such as hacking. Alternatively, a Wi-Fi Direct connection by virtue of its limited wireless range and peer-to-peer architecture offers a higher level of security because an interchangeable module can only be controlled by a smartphone within wireless range. The balance between convenience and security is usually subjective and dependant on the primary role of the host device.

By way of example only, controlling lights by smartphone using an interchangeable module running as a network Wi-Fi device may be highly convenient with a low level of security risk even if the system were compromised by an external attack. A garage door, by comparison, may pose a significant security risk if the system were compromised, making a Wi-Fi Direct configuration of the interchangeable module more desirable.

It can be appreciated that concurrent operation of Wi-Fi Direct and network Wi-Fi in an interchangeable module is capable of supporting more advanced configurations. By way of example only, it may be desirable for interchangeable module 200 to run concurrent Wi-Fi Direct and network Wi-Fi in a garage door mechanism, where opening and closing of the door is limited to a Wi-Fi Direct connection while reporting the state of the door being open or closed can be transmitted via a network Wi-Fi connection allowing a smartphone to remotely determine if a door is open or closed without allowing that remote connection to alter the state of the door.

In another example of using the interchangeable module in a dual access mode, interchangeable module 200 may be configured to utilise network Wi-Fi to monitor and/or report the status of an alarm system in a residential and/or commercial structure, while restricting access to activate and/or deactivate the alarm system to communications using Wi-Fi Direct or another form of peer-to-peer communications where desirable.

The Product App preferably allows the user to choose their own desired configuration of Wi-Fi Direct, network Wi-Fi or concurrent operation to best suit their application and personal preference.

The foregoing description is by way of example only, and may be varied considerably without departing from the scope of the present disclosure. For example, the interchangeable module may be configured with the ability to support multiple communications capabilities, requirements or restrictions so that a single interchangeable module may be connected to a host and used to communicate with different smart phones having different operating standards.

Aspects of the systems and methods described herein may be used in a variety of environments. For example only, the systems and methods described herein can be adapted for use with lighting, gates, blinds, garage doors, fans, pools, timers, power outlets, consumer electronics, computers, vehicles, and air conditioning systems.

Other embodiments will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A device for controlling an electrical apparatus through a wireless communications link with a personal controller, the personal controller having a processor, a user interface, and a wireless communications transceiver, said device comprising:
    a wireless communications control module operable for wireless communication with the personal controller, said wireless communications control module including a first radio transceiver and a second radio transceiver, said first radio transceiver being configured to communicate with the personal controller using a peer-to-peer communications standard;
    an interface connection including at least two power pins and at least one signal pin, said interface connection being configured to physically connect to a receptacle of the electrical apparatus; and
    a microcontroller configured to control, through said interface connection, the electrical apparatus based at least in part on instructions communicated from the personal controller through said wireless control module, said microcontroller being configured to operate said wireless control module in more than one mode, said microcontroller being configured to operate said wireless control module in a first mode using the peer-to-peer communications standard, said microcontroller being configured to operate said first radio transceiver of said wireless control module in a first mode using the peer-to-peer communications standard, said microcontroller being configured to operate said second radio transceiver of said wireless control module in a second mode using a non-peer-to-peer communications standard.

2. The device of claim 1, wherein said microcontroller is configured to operate said wireless control module in the first and second modes concurrently.

3. The device of claim 1, wherein said microcontroller is configured to function as a network client device while operating in the second mode.

4. The device of claim 1, wherein the peer-to-peer communications standard is Bluetooth.

5. The device of claim 1, wherein said interface connection includes a USB plug configured to engage the receptacle of the electrical apparatus.

6. The device of claim 1, wherein the electrical apparatus is a lighting controller.

7. The device of claim 1, wherein the electrical apparatus is a garage door opener.

8. The device of claim 1, wherein the electrical apparatus is a pump.

9. The device of claim 1, wherein the electrical apparatus is an air conditioner.

10. The device of claim 1, wherein said microcontroller is used to set a unique Wi-Fi address ID for said device.

11. The device of claim 1, wherein the user defined parameters include an operating parameter for each mode.

12. The device of claim 1, wherein the personal controller is a smartphone.

13. The device of claim 1, further comprising a non-volatile memory configured to store user-defined parameters loaded into said memory from the personal controller.

14. The device of claim 13, wherein the user defined parameters include an operating parameter for each mode.

15. The device of claim 1, wherein the electrical apparatus is without any integral visual display.

16. The device of claim 1, further comprising a clock calendar configured to permit time or date dependent operations.

17. The device of claim 16, wherein said clock calendar is an embedded function in said microcontroller.

* * * * *